United States Patent [19]

Yonezawa et al.

[11] 4,362,826

[45] Dec. 7, 1982

[54] HEAT-RESISTANT RESIN COMPOSITION

[75] Inventors: Kazuya Yonezawa; Hirosaku Nagano, both of Kobe, Japan

[73] Assignee: Kanegafuchi Kagaku Kogyo Kabushiki Kaisha, Osaka, Japan

[21] Appl. No.: 263,512

[22] Filed: May 14, 1981

[30] Foreign Application Priority Data

May 17, 1980 [JP] Japan .................................. 55-65529

[51] Int. Cl.$^3$ ............................................... C09D 3/70
[52] U.S. Cl. ...................................... 525/426; 528/327
[58] Field of Search ............................................. 525/6

[56] References Cited

U.S. PATENT DOCUMENTS 3,179,634  4/1965  Edwards .............................. 260/78
4,085,164  4/1978  Gruffoz .................................. 525/6
4,183,835  1/1980  Yomoguchi et al. .................. 525/6

Primary Examiner—William F. Hamrock
Assistant Examiner—Peter F. Kulkosky
Attorney, Agent, or Firm—Armstrong, Nikaido, Marmelstein & Kubovcik

[57] ABSTRACT

A composition comprising a varnish of heat-resistant resin having active hydrogen in the molecule and a bismaleimide compound or derivative thereof admixed with the varnish affords a heat-resistant resin product of improved properties. Especially when a bismaleimide compound or derivative thereof is added to a varnish of polyimide resin having active hydrogen in the molecule and the composition is applied to a metal film substrate to form a resin film, the film has improved peel strength and, in itself, also has improved strength and elongation.

10 Claims, No Drawings

HEAT-RESISTANT RESIN COMPOSITION

The present invention relates to improvements in the properties of heat-resistant resins.

Among other known heat-resistant resins, polyimide resin is superior in electrical characteristics, heat resistance and mechanical properties and is therefore used for electrical insulating varnishes and various heat-resistant films. However, when a copper, aluminum or like metal film (or drum or endless belt) is coated with polyimide resin varnishes, the resulting film is not sufficiently high in peel resistance or tensile strength.

We have conducted extensive research on improvement in the properties of heat-resistant resins, especially of polyimide resin varnishes and found that when a bismaleimide is added to a polyimide resin varnish, the varnish composition obtained affords a polyimide resin coating or film which has increased mechanical strength against peeling and also improved elongation while retaining the desired heat resistance. Thus this invention has been accomplished.

Polyimide resin varnishes usable in this invention include varnishes of polyimide which is soluble in organic solvents and has in the molecule active hydrogen as in amino, and varnishes of polyamide acid, i.e. the precursor of polyimide. To be useful in this invention, such varnishes have an inherent viscosity ($\eta_{inh}$) of at least 1.0. It is especially preferable to use varnishes having an inherent viscosity of at least 2.0 in giving remarkably improved properties.

Examples of useful polyamide varnishes are known varnishes resulting from the reaction of an aromatic tetracarboxylic anhydride with an aromatic diamine. Examples of useful aromatic tetracarboxylic anhydrides are pyromellitic dianhydride, benzophenonetetracarboxylic dianhydride, naphthalene-1,2,5,6-dianhydride, 3,3',4,4'-diphenyltetracarboxylic dianhydride, etc. Exemplary of useful aromatic diamines are 4,4'-diaminodiphenylmethane, 4,4'-diaminodiphenyl ether, 4,4'-diaminodiphenylsulfone, etc. The reaction between an acid anhydride and a diamine is conducted preferably with use of a solvent, such as DMF, dimethylacetamide, N-methylpyrrolidone, DMSO, HMPA or like nonprotonic polar solvent. Such solvents are used singly or in admixture. It is also possible to use xylene, toluene or lie aromatic hydrocarbon as admixed with such solvents, in an amount of up to 30% by weight based on the combined amount of solvents used.

The bismaleimides which can be used are compounds represented by the following formula A or B.

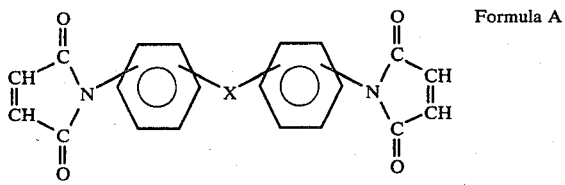

Formula A wherein X is —CH₂—, —O—, —S—, —SO₂—or—C(CH₃)₂—.

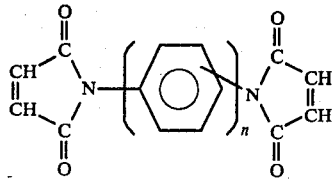

Formula B wherein n is an integer of 1 or 2.

Such a bismaleimide can be prepared easily by subjecting maleic anhydride and the corresponding diamine to condensation with heating in the known manner. Further according to the present invention, it is possible to use bismaleimide derivatives having substituents, such as methyl or like alky, halogen, etc, as shown by formula A' and B' as follows.

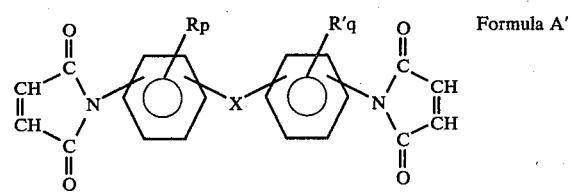

Formula A' wherein X is —CH₂—, —O—, —S—, —SO₂— or —C(CH₃)₂—, R and R' are alkyl or halogen, and p and q are integer of 1~4.

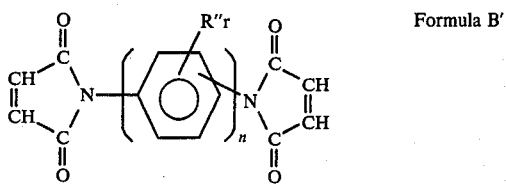

Formula B' wherein R" is alkyl or halogen, n is an integer of 1 or 2, and r is an integer of 1~4.

The bismaleimide is added to the varnish preferably in an amount of 0.1 to 30 parts by weight per 100 parts by weight of the solids of the varnish. Although more than 30 parts by weight of bismaleimide is usable, the resulting composition then gives a brittle product, whereas with less than 0.1 part by weight of bismaleimide present, lesser effects will result. It is more preferable to use 1 to 10 parts by weight of the compound because better results are then achieved not only with respect to peel strength but also to tensile strength and elongation.

The reason why the use of bismaleimides produces various improved properties is presumably that the active hydrogen ending as in amino remaining in polyimide having active hydrogen in the molecule or polyamide acid which is the precursor of polyimide is added to the carbon-carbon double bond of the bismaleimide to give an increased molecular weight. Stated more specifically, in the case where a solution of polyamide acid, i.e. the precursor of polyimide, in an organic solvent is used for preparing a varnish composition according to the invention, the composition is applied and spread over a metal film (or drum or endless belt), and the coated film is heated for removing the solvent and for imidation to form a desired film over the substrate film. It is thought that the bismaleimide reacts with the active ending of the polyamide acid in this step.

The thickness of the film to be formed from the varnish composition of the present invention is preferably about 1 to about 100μ, although not particularly limited. If the composition is applied to an increased thickness to form a film of a larger thickness, the coating is liable to incorporate air bubbles therein during heating. When it is desired to obtain films having thicknesses of larger than 100μ, the composition may be applied repeatedly several times.

Generally when a film is to be formed from the present composition, the coating of the composition is heated at 80° to 150° C. for 15 to 30 minutes to fail tackiness and subsequently heated at 200° to 400° C. for 30 minutes to one hour. When several superposed coats are to be formed, the above procedure is repeated, whereby a polyimide film can be obtained which has a thickness of larger than 100μ.

Thus, heat-resistant resins (such as polyimide, polyamide imide and polyimide imidazopyrrolone) having active hydrogen in the molecule and precursors thereof are widely usable according to the invention. It is especially preferable to use varnishes of polyimide and polyamide acid which is the precursor of polymide.

The present invention will be described below in detail with reference to the following examples, to which, however, the invention is not limited.

EXAMPLES 1-3 AND COMPARISON EXAMPLE 1

A 200 g quantity of 4,4'-diaminodiphenyl ether was dissolved in 1500 ml of N-methylpyrrolidone, and 218 g of pyromellitic dianhydride was slowly added to the solution for reaction to prepare a polyamide acid varnish having an inherent viscosity of 5.0. Different quantities of a bismaleimide were added to different portions of the varnish as listed in Table 1 to obtain varnish compositions according to the invention. The bismaleimide used is represented by the following formula.

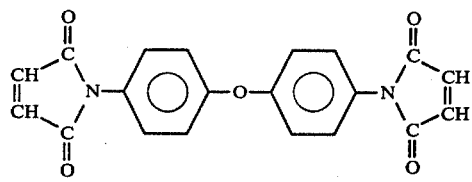

The varnish and the varnish compositions were applied to copper foil and heated at 150° C. for 30 minutes and then at 300° C. for 30 minutes to form polyimide films.

The films were tested for peel strength according to JIS C-6481. Table 1, showing the results, indicates that the films having the bismaleimide incorporated therein are manifestly higher in peel strength than the film of Comparison Example containing no bismaleimide.

TABLE 1

|  | Amount of bismaleimide added (% by weight) | Peel strength (kg/cm) |
| --- | --- | --- |
| Comp. Ex.1 | 0 | 1.02 |
| Example 1 | 2 | 1.55 |
| Example 2 | 5 | 1.68 |
| Example 3 | 10 | 1.75 |

EXAMPLES 4-6 AND COMPARISON EXAMPLE 2

Different amounts of a bismaleimide were added to different portions of the varnish of polyamide acid prepared in Examples 1 to 3 to prepare varnish compositions according to the invention. The bismaleimide used is represented by the following formula.

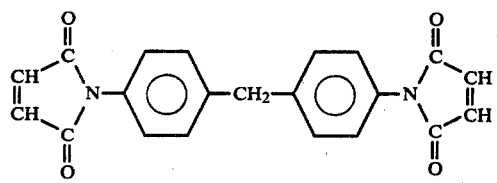

The varnish of Examples 1 to 3 and the varnish compositions obtained were applied to copper foil to form polyimide films on the foil under the same conditions as in Examples 1 to 3. The films were separated from the foil by removing the foil by etching. The films were tested for strength and elongation according to ASTM D-882. Table 2 shows the results.

TABLE 2

|  | Amount of bismaleimide added (% by weight) | Tensile strength (kg/cm$^2$) | Elongation (%) |
| --- | --- | --- | --- |
| Comp. Ex. 2 | 0 | 870 | 14 |
| Example 4 | 2 | 1115 | 51 |
| Example 5 | 5 | 1210 | 36 |
| Example 6 | 10 | 1100 | 21 |

What is claimed is:

1. A heat-resistant resin composition characterized in that the composition comprises a varnish of polyamide acid which is the precursor of polyimide heat-resistant resin having active hydrogen in the molecule and a bismaleimide compound or a derivative thereof admixed with the varnish.

2. A heat-resistant resin composition as defined in claim 1 wherein the varnish of heat-resistant resin having active hydrogen in the molecule is a varnish of polyimide resin having active hydrogen in the molecule.

3. A heat-resistant resin composition as defined in claim 1 wherein the varnish of heat-resistant resin having active hydrogen in the molecule is a varnish of polyamide acid which is the precursor of polyimide.

4. A heat-resistant resin composition as defined in claim 3 wherein the varnish of polyamide acid has an inherent viscosity of at least 1.0.

5. A heat-resistant resin composition as defined in claim 3 which comprises 0.1 to 30 parts by weight of the bismaleimide compound or derivative thereof per 100 parts by weight of the solids of the polyamide acid varnish.

6. A heat-resistant resin composition as defined in claim 5 which comprises 1 to 10 parts by weight of the bismaleimide compound or derivative thereof per 100 parts by weight of the solids of the polyamide acid varnish.

7. A heat-resistant resin composition as defined in claim 1 wherein the bismaleimide compound is represented by the formula

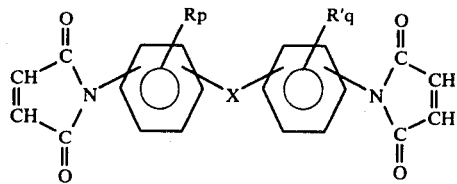

wherein X is —CH$_2$—, —O—, —S—, —SO$_2$— or —C(CH$_3$)$_2$—, R and R' are alkyl or halogen, and p and q are 0 or integer of 1~4.

8. A heat-resistant resin composition as defined in claim 7 wherein the bismaleimide compound is represented by the formula

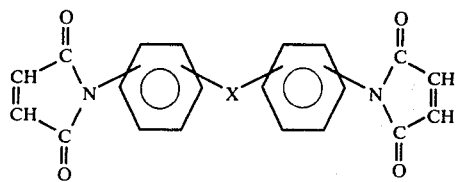

wherein X is —CH$_2$—, —O—, —S—, —SO$_2$—, or —C(CH$_3$)$_2$—.

9. A heat-resistant resin composition as defined in claim 1 wherein the bismaleimide compound is represented by the formula

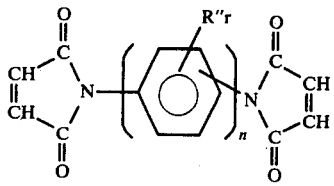

wherein R'' is alkyl or halogen, n is an integer of 1 or 2.

10. A heat-resistant resin composition as defined in claim 9 wherein the bismaleimide compound is represented by the formula

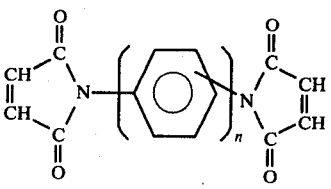

wherein n is an integer of 1 or 2.

* * * * *